US007929676B2

(12) United States Patent
Davis et al.

(10) Patent No.: US 7,929,676 B2
(45) Date of Patent: Apr. 19, 2011

(54) LOCAL ROUTING MANAGEMENT IN A TELECOMMUNICATIONS NETWORK

(75) Inventors: Matthew K. Davis, Broomfield, CO (US); Dan Jordan, Littleton, CO (US); Greg Gualtieri, Denver, CO (US); Richard Terpstra, Superior, CO (US); Janis Griffin, Longmont, CO (US); Murli S. Nair, Superior, CO (US); Susmita G. Saha, Longmont, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 77 days.

(21) Appl. No.: 12/130,714

(22) Filed: May 30, 2008

(65) Prior Publication Data

US 2009/0080630 A1    Mar. 26, 2009

Related U.S. Application Data

(60) Provisional application No. 60/941,223, filed on May 31, 2007.

(51) Int. Cl.
*H04M 3/42* (2006.01)
*H04M 7/00* (2006.01)
*H04L 12/66* (2006.01)

(52) U.S. Cl. ............ 379/201.02; 370/352; 379/221.02; 379/240

(58) Field of Classification Search ............ 379/201.01, 379/201.02, 201.03, 201.05, 201.12, 219, 379/220.01, 221.01, 221.02, 240, 245, 246; 370/352–356
See application file for complete search history.

(56) References Cited

U.S. PATENT DOCUMENTS

| | | | |
|---|---|---|---|
| 5,528,677 A * | 6/1996 | Butler et al. | ............ 379/196 |
| 6,442,169 B1 | 8/2002 | Lewis | |
| 6,614,781 B1 | 9/2003 | Elliott | |
| 6,643,837 B2 | 11/2003 | Campbell | |
| 7,200,150 B2 | 4/2007 | Lewis | |
| 7,564,840 B2 | 7/2009 | Elliott | |
| 7,720,081 B2 | 5/2010 | Lewis | |
| 2007/0115947 A1 | 5/2007 | Nelson | |
| 2008/0013531 A1 | 1/2008 | Elliott | |
| 2008/0025294 A1 | 1/2008 | Elliott | |
| 2008/0025295 A1 | 1/2008 | Elliott | |
| 2010/0254526 A1 | 10/2010 | Davis | |
| 2010/0296508 A1 | 11/2010 | Lewis | |

OTHER PUBLICATIONS

U.S. Appl. No. 12/781,801, entitled "System and Method for Bypassing Data from Egress Facilities," filed May 17, 2010 (Lewis).
U.S. Appl. No. 12/973,233, filed Dec. 20, 2010, Matthew K. Davis.

* cited by examiner

*Primary Examiner* — Harry S Hong

(57) ABSTRACT

An embodiment of a method includes determining a customer service plan identifier from information associated with a received call, determining a route plan associated with the identified customer service plan, and routing the call on a trunk group identified in the determined route plan. The method may further include determining a jurisdiction of the call based on a dialed number identified in the call, determining a local routing number (LRN) associated with the call, and using a portion of the LRN to determine the trunk group. An embodiment of a system includes a switch operable to select a route for routing a call received on an ingress trunk associated with a customer that subscribes to a service plan, wherein the switch is further operable to select the route based on the service plan subscribed to by the customer associated with the ingress trunk.

19 Claims, 7 Drawing Sheets

LOCAL ROUTING MANAGEMENT IN A TELECOMMUNICATIONS NETWORK

CROSS-REFERENCE TO RELATED APPLICATIONS

This application claims benefit of priority to U.S. Provisional Patent Application Ser. No. 60/941,223, entitled "Local Routing Management in a Telecommunications Network", filed on May 31, 2007, and which is incorporated herein by reference for all purposes.

BACKGROUND

Many telecommunications carriers have difficulty implementing local routing capabilities over their softswitch platforms. The ability to determine, develop and manage routes is too big for individuals to manually enter using the existing interfaces of present softswitches. The development, determination and management of routes for the softswitch should preferably take into account a number of factors such as pricing, routing, costs, margins and variable bit rate (VBR) for both domestic and international traffic, including local routing of traffic.

It is with respect to the foregoing issues that embodiments of the present invention have been developed.

SUMMARY

Embodiments of the invention provide methods and systems for local routing management in a telecommunications network. In one embodiment, local routing management is provided by a local routing manager (LRM) and a softswitch. The LRM may be implemented as a software engine that is used to perform least cost routing and operational overrides at the local level on the softswitch network of a telecommunications carrier. Embodiments of the invention provide a combination of resources and data to create jurisdictionalized data for call routing in the softswitch of a telecommunications network. Routing may be performed based on identified customer service plans. Core routing engines may store route plans in partitions that are organized in association with respective customer service plans that can be subscribed to.

An embodiment of a method includes determining a customer service plan identifier from information associated with a received call, determining a route plan associated with the identified customer service plan, and routing the call on a trunk group identified in the determined route plan. The method may further include determining a jurisdiction of the call based on a dialed number identified in the call, determining a local routing number (LRN) associated with the call, and using a portion of the LRN to determine the trunk group. Determining a jurisdiction may include determining whether the call is local or long distance. Determining the customer service plan identifier may include determining an ingress trunk group pseudo-carrier code (PCC).

According to at least one embodiment the portion of the dialed number includes an "NPA-NXX" of the dialed number, and wherein determining whether the call is local or long distance comprises looking up the portion of the dialed number in a local calling area table that associates NPA-NXX's of dialed numbers with NPA-NXX's of calling party numbers, wherein NPA identifies a Number Planning Area, and NXX identifies a central office within the Number Planning Area. The may be a unidirectional local call. Determining the route plan may include determining a partition associated with the identified customer service plan. The method may further include selecting a partition from a plurality of partitions, wherein the partitions are each associated with a customer service plan. The plurality of partitions may include an on-net partition and an off-net partition.

An embodiment of a system includes a switch operable to select a route for routing a call received on an ingress trunk associated with a customer that subscribes to a service plan, wherein the switch is further operable to select the route based on the service plan subscribed to by the customer associated with the ingress trunk. The system may further include a core routing engine (CRE) storing a plurality of route plans. Route plans may be stored in partitions of the CRE. Each of one or more of the partitions may be associated with a service plan. The system may further include a local calling area (LCA) data store storing combinations of portions of calling numbers and portions of called number designating calls that are entitled to local routing. The portions of the calling numbers and the portions of the called numbers can be 6 digit portions or 7 digit portions.

Further still, the LCA data store may be provisioned with data from an HTLT data store. The switch can access the LCA data store to determine whether calls are entitled to local routing. The switch may be configured to identify a partition for determining a route plan for routing the call based on the service plan subscribed to by the customer. The switch may be configured to determine the customer based on an ingress trunk that the call is received on. The ingress trunk may be associated with a pseudo carrier code identifying the service plan.

Another embodiment of a method includes generating one or more route plans, each route plan being associated with a service plan, and provisioning the one or more route plans on a core routing engine accessible by a softswitch for routing calls according to the one or more route plans. The one or more route plans may include an on-net route plan and an off-net route plan. Generating a route plan may include selecting a trunk group ID from a trunk group inventory, the TGID identifying a trunk group, associating the trunk group ID with a plurality of local calling area numbers associated with end-office switches connected to the trunk group, and inserting the TGID in a route plan useable to route calls to the local calling area.

Further, an embodiment of the method may include determining the plurality of local calling area numbers, wherein determining the plurality of local calling area number includes identifying a tandem switch associated with the selected TGID, identifying one or more end-office switches associated with the tandem switch, and identifying local calling area numbers associated with the one or more end-office switches. Identifying the tandem switch, the one or more end-office switches and the local calling area numbers may include performing a look-up in a local exchange routing guide (LERG). Provisioning each of the one or more route plans may include storing each route plan in a partition associated with the service plan.

Further still each of the one or more route plans may include a list of TGIDs identifying trunk groups for use in terminating calls. The TGIDs may be prioritized in the list. The route plan may include one or more of a transit path, a feature group D (FGD) path, or a co-carrier path.

Another embodiment of a system includes a local route manager (LRM) configured to generate one or more route plans associated with one or more respective service levels that customers can subscribe to. The system may further include an inventory of trunk groups containing a plurality of trunk group identifiers (IDs), wherein trunk group IDs are marked as either on-net or off-net. The LRM may generate the one or more route plans by selecting one of the TGIDs of the TG inventory, determining all local calling area numbers that the identified TG can terminate calls to, and associating all the LCA numbers with the selected TGID.

The system may further include a preferred least cost routes database storing off-net least cost carriers in prioritized order of preference. Groups of the preferred least cost carriers may be stored in association with respective LATA-OCNs, wherein a LATA-OCN designates an operating carrier number identifying a carrier associated with a given local access and transport area (LATA). The system of claim 14 wherein the LRM generates off-net route plans by selecting one or more off-net TGIDs from a trunk group inventory based on one or more preferred off-net least cost carriers. The LRM further may generate off-net route plans by identifying the one or more preferred off-net least cost carrier for a given LATA-OCN. Identifying the one or more preferred off-net least cost carriers may include indexing the data store by selected LATA-OCNs to look up the one or more preferred off-net least cost carrier in the data store.

DESCRIPTION

Embodiments of the invention provide methods and systems for local routing management in a telecommunications network. In one embodiment, local routing management is provided by a local routing manager (LRM) and a softswitch. The LRM may be implemented as a software engine that is used to perform least cost routing and operational overrides at the local level on the softswitch network of a telecommunications carrier. Embodiments of the invention provide a combination of resources and data to create jurisdictionalized data for call routing in the softswitch of a telecommunications network. Routing may be performed based on identified customer service plans. Core routing engines may store route plans in partitions that are organized in association with respective customer service plans that can be subscribed to.

Figure 1:
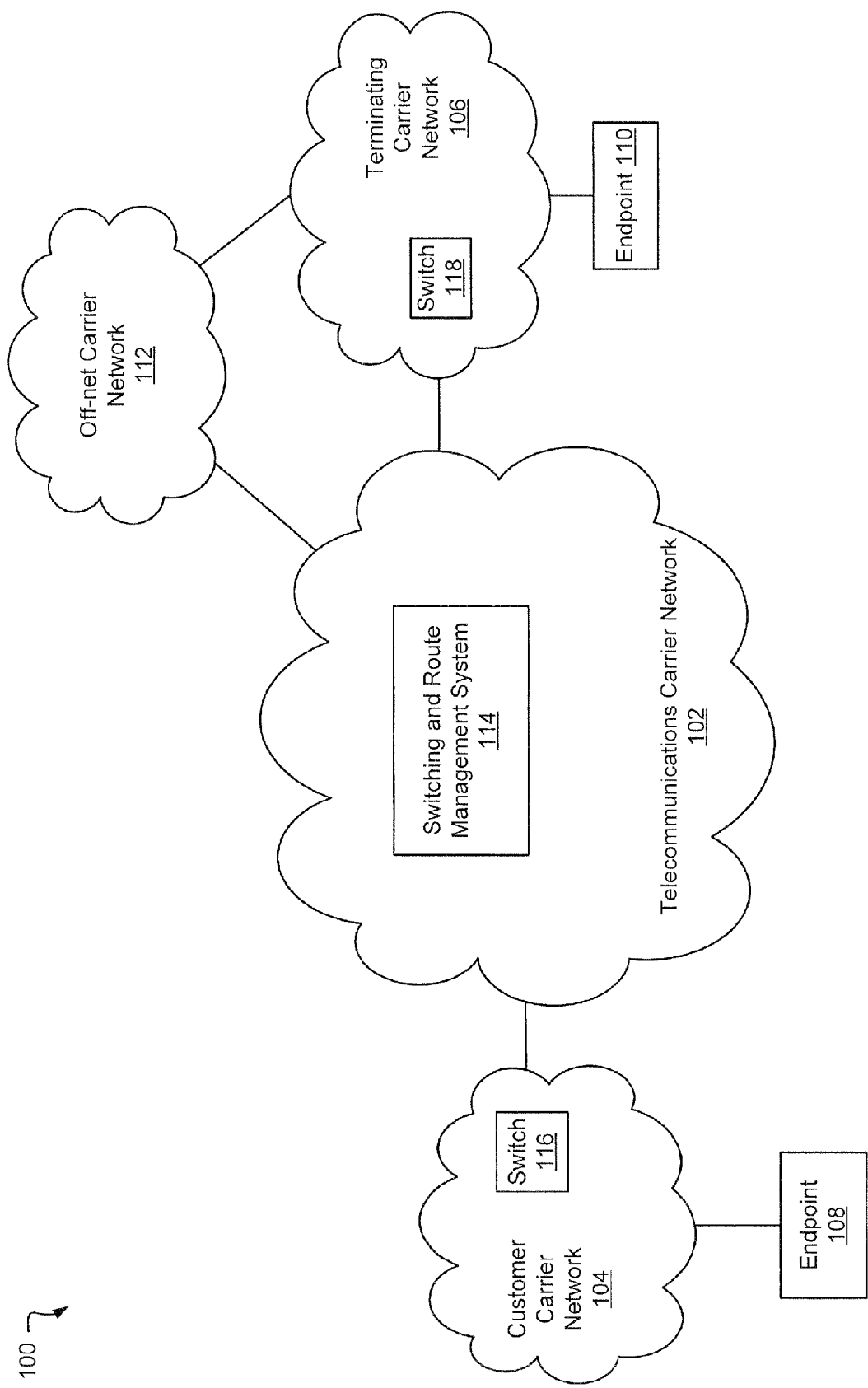
FIG. 1 is an exemplary operating environment where local routing management (LRM) can be implemented and carried out in accordance with various embodiments.

FIG. 1 illustrates an example operating environment 100 in which local route management can be implemented according to some embodiments. The environment 100 includes a telecommunications carrier network 102 that routes calls from customer carrier networks, such as customer carrier network 104, to terminating networks, such as terminating network 106. For purposes of illustration the customer carrier network 104 is associated with a calling party endpoint 108 that can be used to place telephone calls to a dialed party endpoint 110 associated with the terminating carrier network 106. The calling party endpoint 108 has an associated telephone number (TN) referred to as a calling party number (CPN). The dialed party endpoint 110 has an associated telephone number (TN) referred to an a dialed number (DN).

Calls may be routed on-net or off-net by the telecommunications carrier network 102. On-net refers to routing a call through the telecommunications carrier network 102 without routing the call through another service provider network. Off-net refers to routing a call at least in part via another service provider network. For example, a call from customer carrier network 104 may be routed on-net through the telecommunications carrier network 102 directly to the terminating carrier network 106. Alternatively, a call could be routed through an off-net carrier network 112 to the terminating carrier network 106. The customer carrier that owns the customer carrier network 104 can subscribe to different service plans of the telecommunications carrier. For example, one service plan may dictate that calls must be routed on-net, while another service plan may dictate that calls can be routed either on-net or off-net. Other service plans are contemplated.

The telecommunications carrier network 102 is associated with a switching and route management system 114. Generally, the switching and route management system 114 routes calls according to route plans that are provisioned in the system 114. Calls can be routed to the telecommunications carrier network 102 by a switch associated with the customer carrier network 104. The calls are directed to ingress trunks of the telecommunications carrier network 102, where the calls are received by a softswitch of the switching and route management system 114.

As discussed further below each ingress trunk is associated with a customer, so that the softswitch can determine which customer the call is being routed for. The softswitch can thereby select a route plan appropriate to the service plan subscribed to by the customer. Calls are routed to a switch 116 of the terminating carrier network 106, where the calls can be terminated to the dialed endpoint 110. Switch 116 may be an end-office (EO) switch.

As discussed further below, the softswitch relies on route plans and other information populated (e.g., provisioned or stored) on a core routing engine (CRE). For routing and costing, existing systems are used to populate the CRE with the necessary routing details of long distance (LD) traffic. Often times, such existing system are standard across most Tier 1 level carriers for both traditional switching and softswitch services for LD traffic. However, when developing and implementing an end-to-end solution for softswitch logic and management, the existing systems do not have any "out of the box" local routing capabilities for softswitches, and in order to meet this need additional development is required. A local route manager (discussed further below) of the switching and route management system 114 includes functionality for performing intelligent provisioning of the CRE using multiple sets of information.

Figure 2:
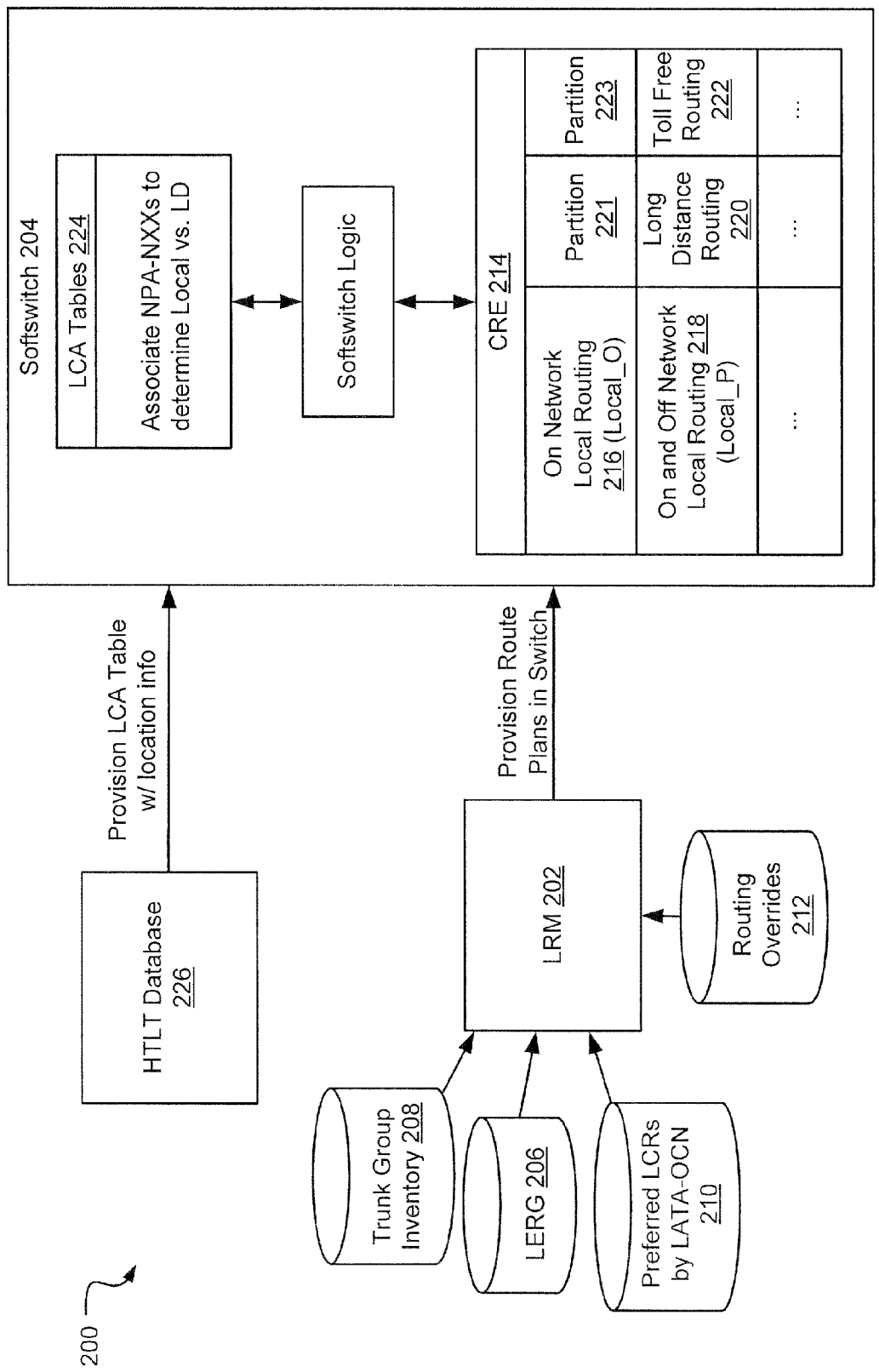
FIG. 2 is a block diagram depicting a system including a local routing manager (LRM) and softswitch according to one embodiment of the invention.

FIG. 2 is a block diagram depicting a high-level exemplary switching and route management system 200 with a local route manager (LRM) 202. The LRM 202 is communicably coupled to a softswitch 204 in a telecommunications network (e.g., network 102, FIG. 1). In some embodiments, the LRM interprets Local Exchange Routing Guide (LERG) data 206, jurisdictional data (TAI), tariff data, trunk group data 208, preferred least cost route (LCR) data 210 (such as least cost route by LATA-OCN of a call), and routing override data 212 (Tier I/TCAM/NOC) in order to generate on-net and off-net local network graphs for the telecommunications carrier.

Preferred LCR data 210 provides least cost routes by local access and transport area (LATA) and operating company number (OCN) in order of preference. For example, preferred LCR data 210 may list off-network routes for each LATA-OCN according to a cost preferred order, based on the costs charged by off-net providers. Routing overrides 212 may include alternative routing information such as Tier 1 carrier routes, technical customer account manager (TCAM) or network operations center (NOC) routes. Routing overrides may be provisioned by the LRM for alternate non-LCR (i.e., not least cost routing) routes The LRM 202 also utilizes information related to two-way trunks, IP trunks, inter-connect agreements, and enhanced services declarations in order to leverage the telecommunications carrier's specific partner agreements. Such services and contract related information can be stored in the preferred LCR data 210, or captured in the prioritized ordering of the LCRs in the preferred LCR data 210.

In one embodiment, the LRM 202 utilizes its generated network graphs to provision local route plans on the softswitch 204. In one embodiment, the route plans are provisioned (e.g., stored in memory or in database on disk) on a core routing engine 214 of the softswitch 204. The LRM 202 may organize these route plans according to a specific service plan assigned to a Customer. For example, a category of service may have a gold, silver and bronze plan, where each plan corresponds to a different quality of service. In this case, route plans may be associated with each of the different service levels and stored in separate partitions of the CRE 214.

Some embodiments of the LRM 202 are operable to determine all local routing paths for a customer's local calling area (LCA) according to the customer's service plan. The LCA is generally designated by the NPA-NXX of a the a telephone number. In addition, some embodiments of the LRM 202 are operable to augment and prioritize these routing paths based on additional data, such as least cost routing (LCR) (e.g., from preferred LCR data 210) and administrative route overrides (e.g., from routing override data 212). All of the route plans generated and organized by the LRM 202 may then be provisioned in the core routing engine (CRE) 214 of the softswitch 204 according to service plan associated with the route plan.

For example, if a customer is associated with a standard plan in which data is only to be routed on-net (i.e., only on the telecommunication carrier's network), then route plans for the calling area number (NPA-NXX's) of the customer will be provisioned according to the service plan and other factors (e.g., LCR and overrides). Then, the plans are stored in a standard partition 216 of the CRE 214 that holds the on-net routing plans (e.g., Local_O). Similarly, if a customer is associated with a premium plan that includes both on-net and off-net (i.e., routes off of the telecommunication carrier's network) routing, then route plans for the calling area numbers (NPA-NXX's) of the customer will be provisioned according to the service plan and other factors (e.g., LCR and overrides). Then, the plans are stored in a premium partition 218 of the CRE 214 that holds both on-net and off-net routing plans (e.g., Local_P).

One skilled in the art will appreciate that a variety of service plans may be offered by a telecommunications provider to route local calls. Embodiments of the invention are not necessarily limited to just on-net and on-net/off-net service plans and may be expanded beyond these offerings. For instance, some service plans may be associated with inter-state and intra-state service. In addition, the CRE may include numerous partitions other than those utilized for storing local routing plans. For example, the CRE may include partitions for long distance routing plans 220 and toll free routing plans 222. Still other partitions, such as partition 221 and partition 223, or others, may be provided that include route plans associated with other service levels.

In one embodiment, LRM 202 may be designed to be compatible with a softswitch/CRE network, for example. The LRM provides a novel ability to determine the route tree, route partitions, and route labels for each NPA-NXX combination (i.e., calling party NPA-NXX and called party NPA-NXX) of a Customer. In some embodiments, the LRM 202 also may provide the ability to provide delta updates in association with: vendor rate changes; LERG updates; changes to the telecommunication carrier's trunking footprint; changes in tariff interpretations; changes in vendor performance.

Embodiments of the LRM 202 may operate in tandem with the softswitch 204. As such, the softswitch 204 includes local calling area (LCA) table(s) 224 that is seeded and continually updated with HTLT data 226, for example. In one embodiment, HTLT data 226 is a set of commercially available local call data. For example, HTLT data 226 can include all local calling areas in the United States. The local calling areas can be indicated based on LCA numbers (e.g., NPA-NXX). From the HTLT data 226 it can be determined whether a call between a given calling party NPA-NXX and a given called party NPA-NXX is within a local calling area, and therefore a local call. One skilled in the art will appreciate that other types of local calling area data than HTLT may be utilized and embodiments of the invention are not limited to HTLT data.

In one embodiment, the HTLT data 226 is provisioned into the LCA table(s) 224. The softswitch 204 then makes a determination whether a particular combination of NPA-NXXs, which are associated with a dialed number (DN) and a calling party number (CPN) of a call to be routed over the softswitch 204, is entitled to local service or long distance service. In one embodiment, the HTLT data 226 in the LCA table 224 indicates whether two given NPA-NXX's, for example X and Y, are local to one another on a unidirectional basis. For instance, X to Y may be considered local, but Y to X may or may not be considered local.

The LRM 202 and softswitch 204, according to embodiments of the invention, assist in routing the call if it is determined to be a local. From the determination of a local call from the LCA table 224 and in combination with an identifier of the customer service plan, the softswitch is able to reference the CRE (which is provisioned by the LRM) to determine the optimal route for the call. In one embodiment, the customer service plan can be determined by an ingress trunk group "pseudo carrier code" (PCC) associated with the call. In one embodiment, PCCs are assigned to trunk groups in every trunk gateway based on a specified characteristic of the calls and the telecommunication carrier's service plan used to terminate the call (on-net, on-net/off-net, premium, standard, etc.). For example, a specified call characteristic may be enhanced or non-enhanced (e.g., the regulatory nature) or the jurisdictional characteristic.

Figure 3:
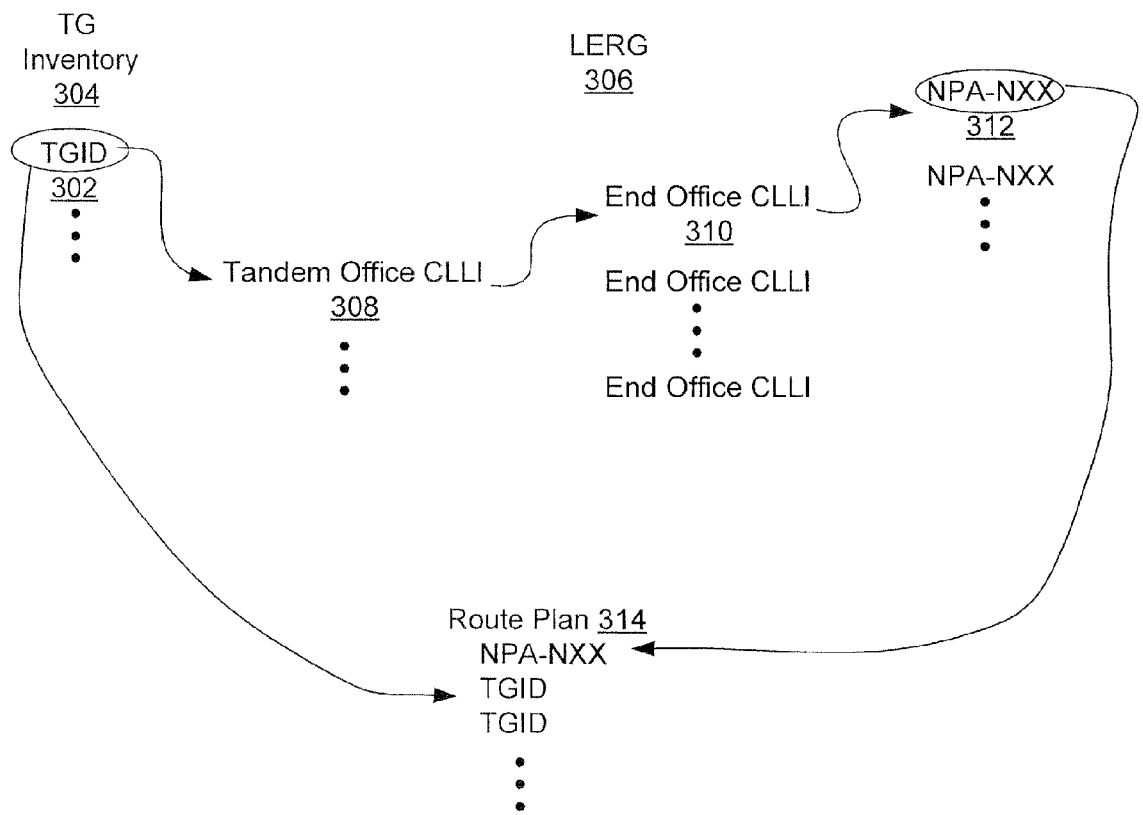
FIG. 3 illustrates an exemplary scheme for developing local routes in accordance with one embodiment.

FIG. 3 illustrates a scheme for generating route plans for local calls in accordance with one embodiment. Trunk group IDs (TGIDs) 302 in the trunk group (TG) inventory 304 are used to index into the LERG 306. Using the TGID 302, an associated tandem switch CLLI 308 can be determined in the LERG 306. The tandem switch CLLI 308 can then be used to index into the LERG 306 again to determine one or more end office (EO) CLLIs 310 identifying terminating end offices. For each EO CLLI 310, the LERG 306 can be accessed to determine associated NPA-NXX's, which correspond to dialed TNs. From this information one or more route plans 314 can be generated that include TGIDs 302 associated with trunk groups that can be used to terminate calls made to determined NPA-NXX's 312.

Figure 4:
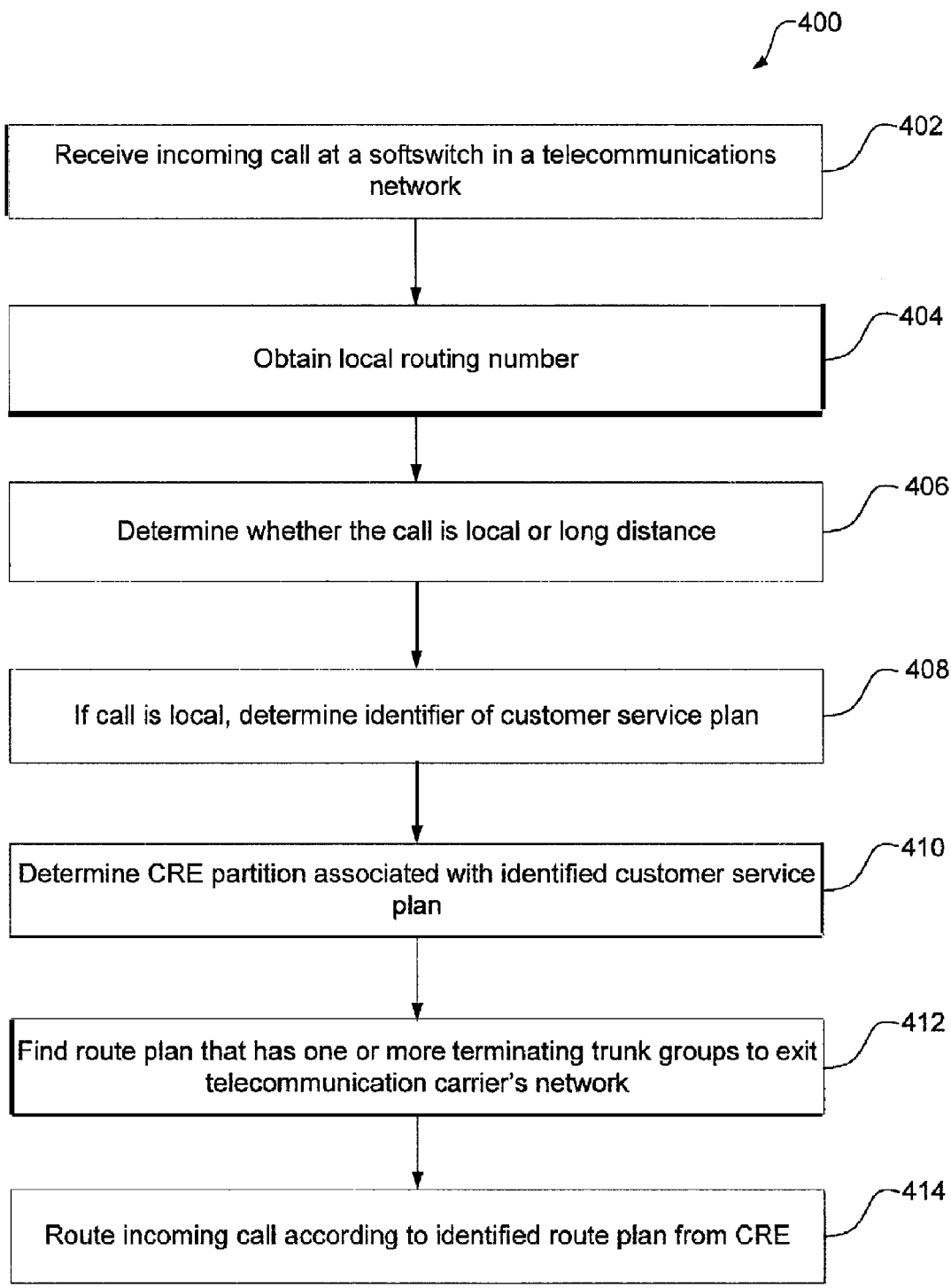
FIG. 4 is an exemplary flow diagram depicting a call flow utilizing a LRM and softswitch according to one embodiment of the invention.

FIG. 4 is a flow diagram depicting a high-level exemplary call flow 400 according to one embodiment of the invention. The diagram depicts a process utilized by a softswitch 204 communicably coupled to a LRM 202 in a telecommunications network to determine a route plan for an incoming local call to the softswitch. The selected route plan by the softswitch is a preferred and possibly service-level specific route plan that was previously provisioned into the softswitch 204 via the LRM 202, as described with respect to FIG. 2.

In a receiving operation 402 the softswitch receives a call. A local routing number (LRN) is obtained in obtaining operation 404. In one embodiment, obtaining operation 404 determines if the received call has been dipped (i.e., examined) for local number portability purposes. If not, an LNP dip (examination) is performed to determine if the dialed number (DN) is ported and thus obtain local routing number (LRN).

In a determining operation 406 it is determined whether the call is a local or long distance call. In one embodiment, determining operation 406 determines whether the call is local or long distance based on NPA-NXX's of the dialed number (DN) and calling party number (CPN) of the call. This can be done by comparing the NPA-NXX's of the DN and the CPN across the LCA table. If the DN NPA-NXX and the CPN NPA-NXX are associated together in the LCA table, the call is determined to be a local call. Determination of local or long distance jurisdiction can be based on analysis of 6 digits (NPA-NXX) and/or 7 digits (NPA-NXX-X). In one embodiment, the CRE determines local or long distance jurisdiction by examining multiple combinations of NPA-NXX's (6 digit NPA-NXX) and NPA-NXX-X's (7 digit NPA-NXX-X). For example, the CRE examines 6 digit to 6 digit, 6 digit to 7 digit, 7 digit to 7 digit, and 7 digit to 6 digit.

Another determining operation 408 determines a customer service plan (CSP) identifier if the call is determined to be local. In one embodiment, the determining operation 408 determines the CSP identifier based on the ingress TG pseudo carrier code (PCC) from incoming call information. In some embodiments, the TG PCC is appended into the call upon receipt of the call at the TG. The softswitch can then read the PCC from the call.

In another determining operation 410, a CRE partition is determined. In one embodiment the customer service plan ID and LCA table(s) result are used to index into the CRE to identify a partition associated with the Customer service plan. In finding operation 412, the NPA-NXX of the LRN is found in the identified partition of the CRE. The NPA-NXX is matched with an entry in the identified partition to find a route label (μL) that contains one or more TGs for exiting the telecommunication carrier's network.

Figure 5:
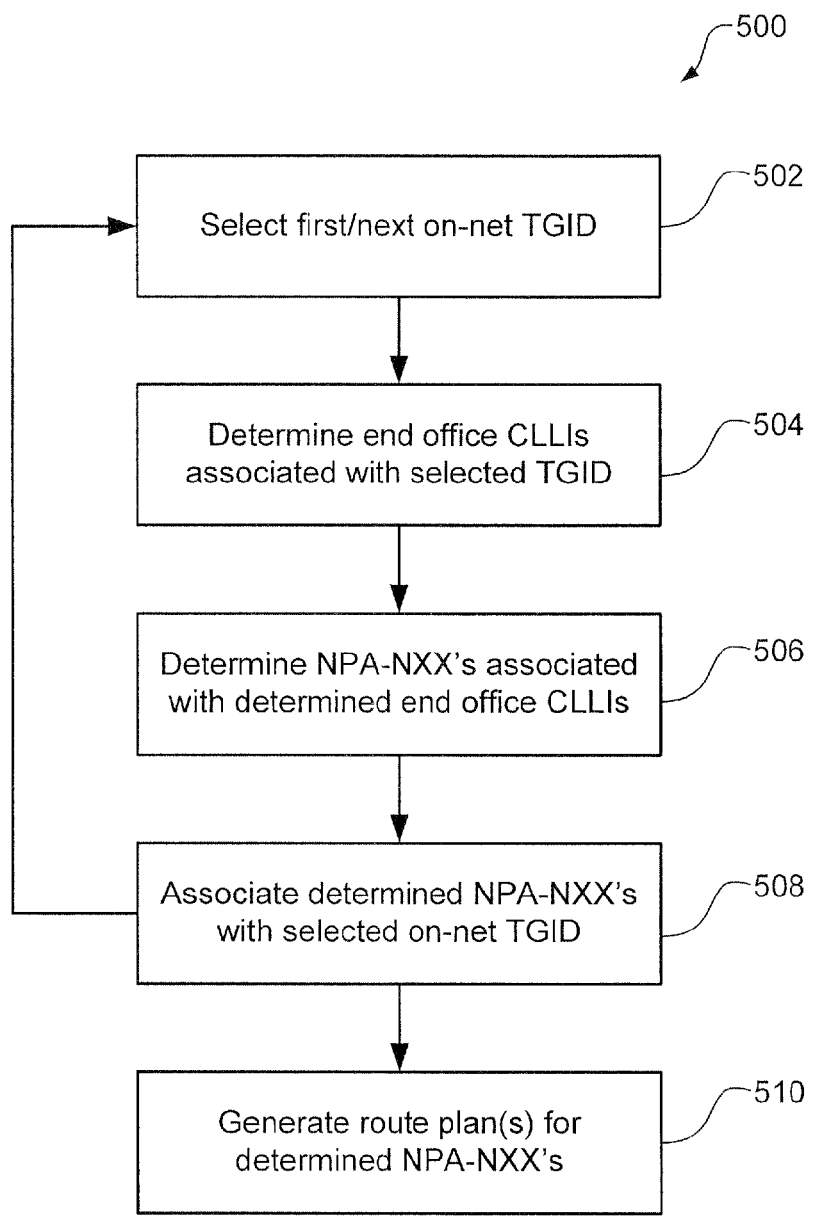
FIG. 5 is another exemplary flow diagram depicting on-net route plan development in accordance with one embodiment.

FIG. 5 is a flow diagram illustrating a process that can be carried out by a local route manager (LRM) to generate an on-net route plan. More specifically, the process generates a route plan for terminating calls using on-net trunk groups. The route plan can be provisioned to a CRE partition associated with a service plan that provides on-net routing. Customer carriers can subscribe to the on-net service plan. As discussed above with respect to FIG. 4, when a local call is received from a customer carrier that subscribes to an on-net route plan, the switch will identify the customer carrier service plan (e.g., with the PCC) and access the partition associated with the on-net service plan.

In selecting operation 502 a first (or next) on-net trunk group ID (TGID) is selected. In one embodiment, the on-net TGID is selected from a TG inventory. TGIDs in the inventory are marked or flagged with indicators whether the TGIDs are associated with on-net or off-net TGs. Determining operation 504 determines one or more end-office CLLIs associated with the selected TGID. In one embodiment, on-net route plans are created at the end-office CLLI switch homing arrangement (SHA) level. In this embodiment, the determining operation searches for the selected TGID z_clli in the LERG database to identify a tandem switch CLLI, and then searches the LERG for end-office CLLIs associated with the tandem switch. A trunk group z_clli corresponds to the local exchange carrier (LEC) termination CLLI as specified in the LERG (e.g. EO_CLLI). Generally, trunkgroups are not identified in the LERG, but switch CLLIs are. By matching a trunkgroup's (end point) z_clli to the switch CLLI, it is possible to obtain LERG data for that trunkgroup.

In another determining operation 506 NPA-NXX's are determined that are associated with the end-offices identified in operation 504. In one embodiment, determining operation 506 searches the LERG database for NPA-NXX's associated with each identified end-office. An associating operation 508 associates the determined NPA-NXX's with the selected TGID. The process 500 repeats for all on-net TGIDs in the inventory. After all on-net TGIDs have been associated with NPA-NXX's, a generating operation 510 generates an one or more on-net route plans. Each route plan for a given NPA-NXX includes a list of TGIDs identifying trunk groups that can be used to terminate local calls to the given NPA-NXX.

Figure 6:
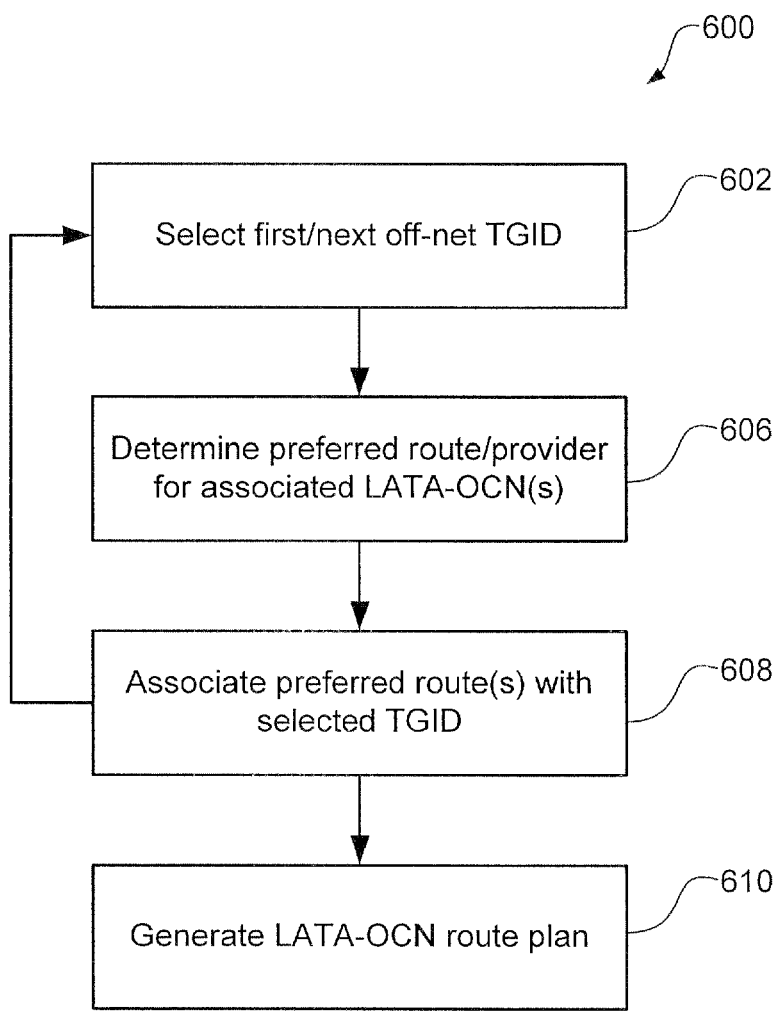
FIG. 6 is another exemplary flow diagram depicting off-net route plan development in accordance with one embodiment.

FIG. 6 is a flow diagram illustrating a process that can be carried out by a local route manager (LRM) to generate an off-net route plan. More specifically, the process generates a route plan for terminating calls using off-net trunk groups. The off-net route plan can be provisioned on a CRE partition associated with a service plan that provides off-net routing. Calls received from customer carrier networks that subscribe to an off-net service plan, will be directed to the partition associated with the off-net service plan.

In general, an off-net trunk group can route to any LATA-OCN. A LATA-OCN is a number identifying a carrier associated with a given local access and transport area (LATA). For this process, a data store may be used that stores identifiers of preferred least cost carriers (e.g., service providers) in association with each of multiple LATA-OCN.

In a selecting operation 602 a first or next off-net TGID is selected from a TG inventory. Determining operation 606 determines one or more preferred off-net routes and/or carriers. In one embodiment, the determining operation 606 chooses one or more provider routes from a prioritized list of providers based on an associated LATA-OCN. For example, a database of preferred routes (e.g., preferred LCRs database 210, FIG. 2) may be searched for preferred off-net routes associated with one or more LATA-OCNs. In one embodiment, the preferred routes database identifies carriers, which for a given LATA-OCN, should be used in a specified order.

An associating operation 608 associates the list of carrier routes with the selected TGID. The process 600 repeats until all off-net TGIDs are selected and associated with the preferred off-net carrier routes. A generating operation 610 generates one or more off-net route plans that can be provisioned on the CRE.

Figure 7:
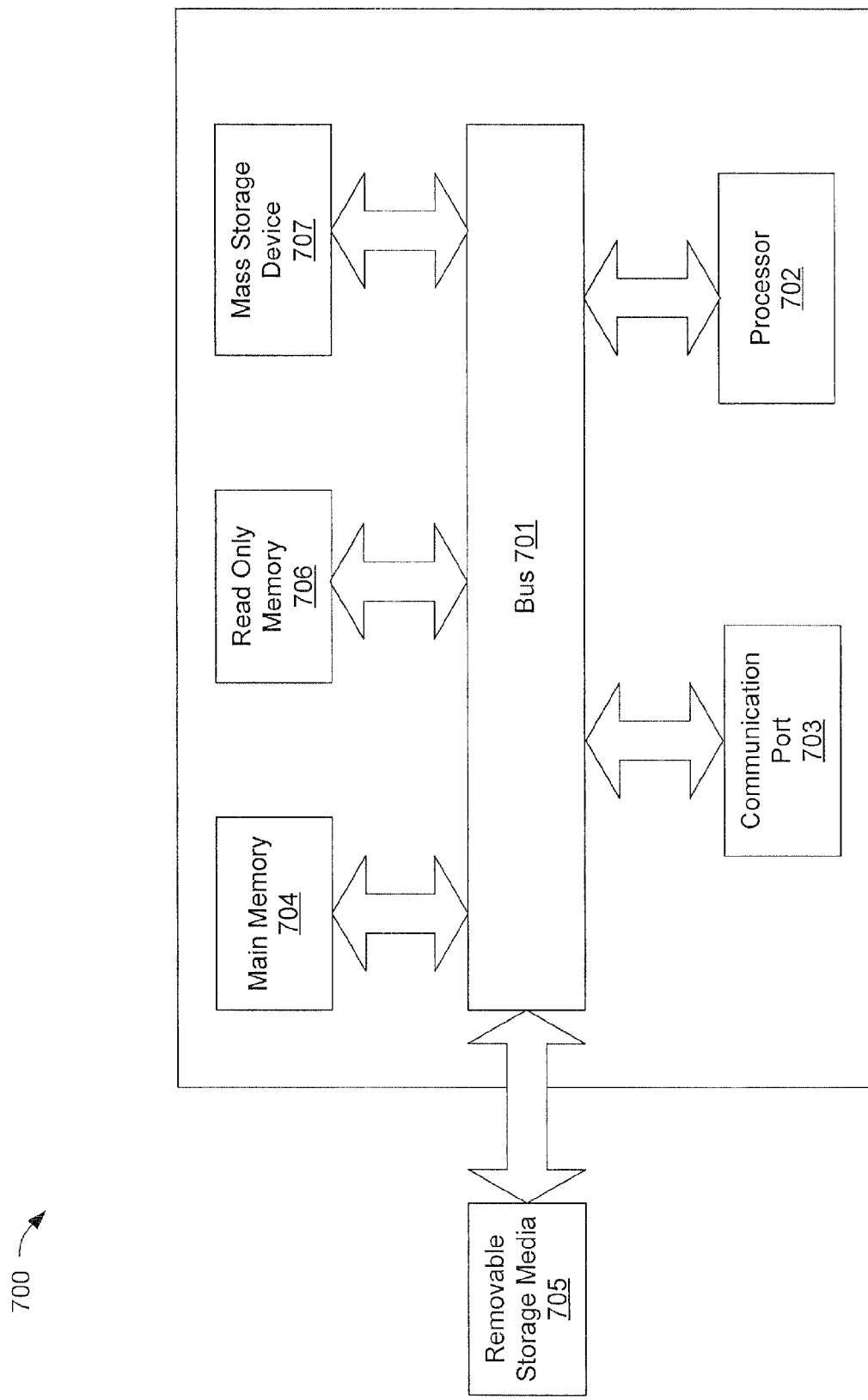
FIG. 7 illustrates an exemplary computing device upon which embodiments of the present invention can be implemented and practiced.

FIG. 7 is a schematic diagram of a computing device 700 upon which embodiments of the present invention may be implemented and carried out. For example, one or more computing devices 700 or similar devices can carry out one or more of the operations shown in FIGS. 4-6. As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware.

According to the present example, the computing device 700 includes a bus 701, at least one processor 702, at least one communication port 703, a main memory 704, a removable storage media 705, a read only memory 706, and a mass storage 707. Processor(s) 702 can be any know processor, such as, but not limited to, an Intel® Itanium® or Itanium 2® processor(s), AMD® Opteron® or Athlon MP® processor (s), or Motorola® lines of processors. Communication port(s) 703 can be any of an RS-232 port for use with a modem based dialup connection, a 10/100 Ethernet port, a Gigabit port using copper or fiber, or a USB port. Communication port(s) 703 may be chosen depending on a network such a Local Area Network (LAN), Wide Area Network (WAN), or any network to which the computing device 700 connects. The computing device 700 may be in communication with peripheral devices (not shown) such as, but not limited to, printers, speakers, cameras, microphones, or scanners.

Main memory 704 can be Random Access Memory (RAM), or any other dynamic storage device(s) commonly known in the art. Read only memory 706 can be any static storage device(s) such as Programmable Read Only Memory (PROM) chips for storing static information such as instructions for processor 702. Mass storage 707 can be used to store information and instructions. For example, hard disks such as the Adaptec® family of SCSI drives, an optical disc, an array of disks such as RAID, such as the Adaptec family of RAID drives, or any other mass storage devices may be used.

Bus 701 communicatively couples processor(s) 702 with the other memory, storage and communication blocks. Bus 701 can be a PCI/PCI-X, SCSI, or USB based system bus (or other) depending on the storage devices used. Removable storage media 705 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Embodiments of the present invention include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Embodiments of the present invention may be provided as a computer program product, which may include a machine-readable medium having stored thereon instructions, which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

What is claimed is:

1. A method for servicing calls on a packet-switched network, wherein the packet-switched network is communicatively connected to a plurality of trunk groups, the method comprising:
    designating in a database a subset of the plurality of trunk groups for use in local call routing;
    receiving a call;
    determining whether the received call is entitled to local call routing;
    determining a customer service plan from information associated with the received call;
    if the received call is determined to be entitled to local call routing, using the customer service plan to select one or more trunk groups from the subset of trunk groups; and
    routing the received call on at least one egress trunk group identified from the subset of trunk groups.

2. The method of claim 1, further comprising:
    using a portion of a local routing number associated with the received call to identify the at least one egress trunk group from the selected one or more trunk groups.

3. The method of claim 1, wherein determining the customer service plan comprises determining an ingress trunk group pseudo-carrier code (PCC).

4. The method of claim 1, wherein a dialed number associated with the received call comprises an NPA-NXX, and wherein determining whether the received call is entitled to local call routing comprises looking up the dialed number in a local calling area table that associates NPA-NXX's of dialed numbers with NPA-NXX's of calling party numbers, wherein NPA identifies a Number Planning Area, and NXX identifies a central office within the Number Planning Area.

5. The method of claim 4, wherein the received call is a unidirectional local call.

6. The method of claim 1, wherein the subset of trunk groups comprises at least one on-net trunk group and at least one off-net trunk group.

7. A system comprising:
    a switch operable to select a route for routing a call received on an ingress trunk associated with a customer that subscribes to a service plan, wherein the switch is further operable to select the route based on the service plan subscribed to by the customer associated with the ingress trunk.

8. The system of claim 7, further comprising:
    a core routing engine (CRE) operable to store a plurality of route plans for each of a plurality of service plans to which customers can subscribe.

9. The system of claim 8, wherein the plurality of route plans are stored in a plurality of partitions of the CRE in accordance with the plurality of service plans.

10. The system of claim 7, further comprising a local calling area (LCA) data store operable to store combinations of portions of calling numbers and portions of called numbers designating calls that are entitled to local routing.

11. The system of claim 10, wherein the portions of the calling numbers and the portions of the called numbers are either 6 digit portions or 7 digit portions.

12. The system of claim 10, wherein the LCA data store is operable to be provisioned with data from an HTLT data store.

13. The system of claim 10, wherein the switch is operable to access the LCA data store to determine whether calls are entitled to local routing.

14. The system of claim 9, wherein the switch is operable to identify a partition for determining a route plan for routing the received call based on the service plan subscribed to by the customer.

15. The system of claim 7, wherein the switch is operable configured to determine the customer based on the ingress trunk.

16. The system of claim 15, wherein the ingress trunk is associated with a pseudo carrier code identifying the service plan of the customer.

17. The system of claim 7, wherein the selected route comprises an off-net route.

18. The method of claim 1, wherein the received call is a telephone call.

19. The system of claim 7, wherein the received call is a telephone call.

* * * * *